United States Patent

Bryson et al.

[11] Patent Number: 6,059,941
[45] Date of Patent: May 9, 2000

[54] APPARATUS FOR GENERATING A STERILIZING SOLUTION

[75] Inventors: Julian Bryson, Calne; James Spickernell, London; Ian Woodcock, Hungerford, all of United Kingdom; Nougzar Djeiranishvili; Sergei Boutine, both of Moscow, Russian Federation; Marina Kirk, Aldershot, United Kingdom

[73] Assignee: Solenzara International Limited, Tortola, Virgin Islands (Br.)

[21] Appl. No.: 09/306,849

[22] Filed: May 7, 1999

Related U.S. Application Data

[63] Continuation of application No. 08/869,711, Jun. 5, 1997, abandoned.

[30] Foreign Application Priority Data

Sep. 26, 1996 [GB] United Kingdom .................. 9620102

[51] Int. Cl.$^7$ .................................................... C02F 1/461
[52] U.S. Cl. .......................................... 204/263; 204/275
[58] Field of Search .................... 205/701, 746; 204/275, 263

[56] References Cited

U.S. PATENT DOCUMENTS

| | | | |
|---|---|---|---|
| 3,622,721 | 11/1971 | Hodes et al. | 210/96 |
| 4,308,124 | 12/1981 | Pellegri | 204/95 |
| 4,767,511 | 8/1988 | Aragon | 204/128 |
| 4,880,513 | 11/1989 | Davis et al. | 204/182.4 |
| 5,578,193 | 11/1996 | Aoki et al. | 204/746 |
| 5,720,869 | 2/1998 | Yamanaka et al. | 205/742 |
| 5,759,489 | 6/1998 | Miura et al. | 205/746 |

FOREIGN PATENT DOCUMENTS

| | | |
|---|---|---|
| 7-024467 | 1/1995 | Japan . |
| 7-171564 | 7/1995 | Japan . |
| 8-141568 | 6/1996 | Japan . |
| 2 274 113 | 7/1994 | United Kingdom . |
| WO 94/26670 A1 | 11/1994 | WIPO . |

*Primary Examiner*—Arun S. Phasge
*Attorney, Agent, or Firm*—Akin, Gump, Strauss, Hauer & Feld, L.L.P.

[57] ABSTRACT

A method and apparatus for generating a sterilizing solution, wherein there is generated a supply of softened water by passing water through an ion-exchange water softener, and a supply of saturated salt solution by mixing a first part of the supply of softened water with a supply of salt. A second part of the supply of softened water is mixed together with a first part of the supply of saturated salt solution in a predetermined ratio and passed through at an electrolytic cell having a working chamber and an auxiliary chamber separated by a porous membrane, one of the chambers including an anode and the other including a cathode, the output from the working chamber being the sterilizing solution. The ion-exchange water softener is regenerated with a second part of the supply of saturated salt solution.

1 Claim, 1 Drawing Sheet

APPARATUS FOR GENERATING A STERILIZING SOLUTION

This application is a continuation of application Ser. No. 08/869,711, filed Jun. 5, 1997, now abandoned.

The present invention relates, among other aspects, to a method and apparatus for producing a sterilising solution by way of the electrolytic treatment of an aqueous salt solution.

It is important in hospitals to be able to provide a sterile environment, particularly in operating theatres and other situations where invasive treatments are being performed. Surgical instruments and other apparatus must be sterilised before use in order to reduce the risk of bacterial infection. An existing method of sterilisation is the application of heat in an autoclave, but this is not suitable for surgical apparatus, such as heat-sensitive endoscopes, which can not withstand high temperatures.

Another method involves the use of a chemical sterilising solution, such as glutaraldehyde. This can be unsatisfactory due to patient intolerance of the chemicals used in the solution and also to the low sporicidal activity of glutaraldehyde. Other disinfectants such as chlorine dioxide and peracetic acid are expensive and are not generated on demand. These known sterilising solutions are generally made up in batch form, and it can be difficult to ensure a constant and economical supply of solution.

It is known from GB 2253860, the disclosure of which is incorporated into the present application by reference, to treat water by passing this through an electrolytic cell having anode and cathode flow chambers separated by a porous membrane, one of the chambers being a working chamber through which water to be treated passes in an upward direction, and the other being an auxiliary chamber, which is in closed communication with a gas-separating chamber located at a higher level than the electrolytic cell. Water having a higher salt and/or mineral content than the water to be treated passes upwardly through the auxiliary chamber to the gas-separating chamber and recirculates to the auxiliary chamber by convection and by the shearing forces applied to the water through the rise of bubbles of gas which are generated on the electrode in the auxiliary chamber. The water pressure in the working chamber is higher than that in the auxiliary chamber, and gaseous electrolysis products are vented from the gas-separating chamber by way of a gas-relief valve.

This electrolytic process acts on salts and minerals dissolved in the water, such as metal chlorides, sulphates, carbonates and hydrocarbonates. Where it is the working chamber which includes the cathode, the alkalinity of the water may be increased through the generation of highly-soluble metal hydroxides as a result of cathodal treatment. Alternatively, the electrolytic cell may be switched so that the working chamber includes the anode, in which case the acidity of the water is increased through the generation of a number of stable and unstable acids as a result of anodal treatment. It is, however, difficult to control the variable factors such as the degree of electrolysis, the concentration of dissolved salts and minerals and the water flow rates so as to ensure a consistent supply of sterilising solution.

A further electrolytic cell is known from GB 2274113, the disclosure of which is incorporated into the present application by reference. This cell comprises a pair of coaxial electrodes, separated by a ceramic diaphragm, thereby defining a pair of coaxial chambers. This electrolytic cell is structurally very similar to that disclosed in GB 2253860.

According to the present invention, there is provided a method of generating a sterilising solution, the method comprising the steps of:

i) generating a supply of softened water by passing a water supply through at least one ion-exchange water softener;

ii) generating a supply of saturated salt solution with a first part of the supply of softened water and a supply of salt;

iii) mixing a second part of the supply of softened water and a first part of the supply of saturated salt solution together in a predetermined ratio and passing this mixture through at least one electrolytic cell having a working chamber and an auxiliary chamber separated by a porous membrane, one of the chambers including an anode and the other including a cathode;

iv) regenerating the at least one ion-exchange water softener with a second part of the supply of saturated salt solution;

wherein the output of the working chamber of the at least one electrolytic cell comprises the sterilising solution.

According to a second aspect of the present invention, there is provided an apparatus for generating a sterilising solution, the apparatus comprising:

i) at least one ion-exchange water softener;

ii) a saturated salt solution tank; and iii) at least one electrolytic cell having a working chamber and an auxiliary chamber separated by a porous membrane, one of the chambers including an anode and the other including a cathode;

whereby, in use:

iv) water is supplied to the at least one ion-exchange water softener so as to generate a supply of softened water;

v) a first part of the supply of softened water is passed to the saturated salt solution tank, in which salt is dissolved in the softened water so as to generate a saturated salt solution;

vi) a second part of the supply of softened water is mixed at a predetermined ratio with a first output from the saturated salt solution tank to generate a mixture of softened water and saturated salt solution;

vii) the mixture is passed through the working and auxiliary chambers of the at least one electrolytic cell; and viii) a second output from the saturated salt solution tank is passed to the at least one ion-exchange water softener;

wherein the output of the working chamber of the at least one electrolytic cell comprises the sterilising solution.

Advantageously, there is provided computer means which serves to control the method and apparatus of the present invention, as will be further explained hereinbelow. In general, the working chamber of the electrolytic cell will include the anode, and the auxiliary chamber the cathode, although for some applications this configuration may be reversed.

Preferably, two water softeners are provided, of which one will be on active duty and the other in stand-by mode. The working time, or active duty time of each water softener before its ion-exchange resin needs to be regenerated is determined by, among other things, the flow rate and the hardness of the local water supply. These can be determined during the initial installation of the apparatus so as to define an active duty time for each water softener. While the first water softener is on active duty, the second will be under-going regeneration, until expiry of the active duty time at which point the second water softener will go on active duty and the first will undergo regeneration. This process is repeated, under the control of the computer means, thereby ensuring a continuous supply of softened water. The water softeners are regenerated by passing first saturated salt solution through the ion-exchange resin, followed by mains water. In an exemplary embodiment, a soft water production rate of 500 liters per hour with a water hardness of 350 ppm will require regeneration every 20 minutes. The relationship between the water hardness/flow rate and the regeneration time is inversely proportional. Softened water may be stored in a softened-water storage tank, which is preferably fitted with sensing means which determines when the tank is full or empty and which halts supply of softened water to the tank when this is full and which halts the production of sterilising fluid and raises an alarm when the tank is empty.

Saturated salt solution is used in the present invention to produce a sterilising solution as well as to regenerate the at least one water softener. The saturated salt solution is preferably made up as required by dissolving crystalline salt in softened water. Suitable salts include sodium chloride, potassium chloride and lithium chloride, or any combination thereof. It is important when making up the salt solution to ensure that there is adequate salt to achieve saturation, but not so much as to result in overflow of the vessel in which the salt solution is being made up. This may be achieved by passing a first part of the supply of softened water to the saturated salt solution tank, which may comprise a make-up tank and a storage tank which may each be provided with level-sensing means. Upon initial start-up of the present invention, these tanks will both be empty. A given volume (e.g. 30 liters) of water is added to the make-up tank followed by a predetermined amount (e.g. 70 kg) of salt. Salt addition is stopped if the level-sensing means indicate that the make-up tank is full. Water is then added until the make-up tank is full, if it is not so already, and the solution circulated for a predetermined time (e.g. 10 minutes) until saturation is achieved. A volume of saturated salt solution equal to the given volume of water (e.g. 30 liters) is then transferred to the storage tank and a further given volume (e.g. 30 liters) of water added to the make-up tank. This cycle is repeated in order to make up fresh saturated salt solution as the solution in the storage tank is used in the water softeners and the at least one electrolytic cell. Eventually, as the salt in the make-up tank is used up, the addition of the given volume of water (e.g. 30 liters) will fail to cause the fill level in the make-up tank to reach a predetermined low level as a result of the crystalline salt displacing less water. At this point, salt is added to the make-up tank until the level-sensing means indicate that the tank is full again.

A second part of the softened water supply, advantageously drawn from the softened-water storage tank, is passed, by way of mixing means where softened water is mixed at a predetermined ratio with a first output of the saturated salt solution storage tank, to the at least one electrolytic cell. The mixing means advantageously comprises a venturi which serves to draw saturated salt solution into the stream of softened water at a predetermined and adjustable rate so as to achieve the required mixture ratio. The mixture of softened water and saturated salt solution is then passed at a predetermined and adjustable rate to the at least one electrolytic cell. A second output from the saturated salt solution storage tank is passed to the at least one water softener for regeneration purposes.

The ratio of softened water to saturated salt solution and the rate at which the mixture is passed through the at least one electrolytic cell are determined according to installation and operating requirements so as to generate an output from the at least one electrolytic cell with specific chemical properties, e.g. with a predetermined pH value or range of pH values (from 1.00 to 14.00 or any value or range therebetween or including one or other of these limits) and/or redox potential or range of redox potentials (from, say, −900 to 1400 mV or any value or range therebetween or including one or other of these limits). This may be achieved by monitoring the pH and/or redox potential and/or other required parameters and controlling the softened water to saturated salt solution ratio and the flow rate through the at least one electrolytic cell accordingly. Furthermore, the ratio of softened water to saturated salt solution is also determined by the amount of current drawn by the at least one electrolytic cell, and this may also be monitored and controlled so as to ensure consistent product characteristics. This monitoring and control regime may be managed by the computer means.

In a preferred embodiment of the present invention, the output from the anode chamber of the at least one electrolytic cell comprises the sterilising solution, which is passed to storage, and the output from the cathode chamber is passed to waste. The sterilising solution produced by this embodiment of the invention may have a pH of 5.0 to 7.0 and a redox potential of 900 to 1200 mV, although the process may be set up to produce and monitor a sterilising solution with other pH and redox potentials, e.g. 4.0 to 7.0 and/or 800 to 1300 mV. Furthermore, should the output from the at least one electrolytic cell not have chemical properties which satisfy the predetermined criteria, it may be passed to waste. In one embodiment of the present invention, the output from the at least one electrolytic cell is such as to meet a demand for sterilising solution of 250 liters per hour.

The sterilising solution which is produced by the present invention may be stored in a sterilising solution storage tank, which may be provided with level-sensing means so as to determine when the tank is full, in which case production of sterilising fluid may be halted, or when the tank is empty, in which case dispensing of sterilising fluid may be halted and an alarm raised. The storage tank may also be provided with monitoring means, e.g. pH and/or redox potential sensors, which check to see that the stored sterilising solution continues to meet the required chemical criteria. If these criteria are not met, further dispensing of sterilising solution may be halted and the storage tank evacuated.

A part of the supply of sterilising solution may be mixed, e.g. by way of a venturi, at a predetermined ratio with water to generate a supply of sterile water. This water may be drawn from the softened-water storage tank, or may be softened or ordinary water supplied from a different source. In one embodiment of the present invention, sterile water comprising a 1% solution of sterilising solution and water is supplied to a sterile water storage tank. The sterile water will have a predetermined redox potential (in the range 300 to 900 mV, for example), and this redox potential may be monitored in the storage tank. Should the redox potential of the sterile water fall outside its specified range, the sterile water may be passed to waste. The sterile water storage tank may also be provided with level-sensing means so as to determine when the tank is full, in which case production of sterile water may be halted, or when the tank is empty, in which case dispensing of sterile water may be halted and an alarm raised.

Periodically, it may be necessary to sterilise the various components of the present invention, in particular the softened-water storage tanks and any in-line filters which may be included in the system. This may be achieved by flushing the system through with sterilising fluid from the sterilising fluid storage tank so as to eliminate or inhibit any bacterial growth which may be present.

BRIEF DESCRIPTION OF THE DRAWING

For a better understanding of the present invention, and to show how it may be carried into effect, reference will now be made to the accompanying Figure, in which there is shown in schematic outline a preferred embodiment of the invention.

Mains water is supplied by a pump 1, via a temperature probe 2, which checks that the incoming water temperature is between, say, 10° C. and 25° C., to a three-way solenoid valve 3. The mains water is then passed to whichever one of two water softeners 4, 5 is on active duty, unless the temperature of the incoming water is outside the specified range, in which case the water is pumped to waste 6 by way of the three-way valve 3. The output of each water softener 4, 5 passes to a two-way solenoid valve 7, 8 from where softened water is passed to the process and from where regeneration fluid is passed to waste 6, depending on whether the water softener 4, 5 is on active duty or undergoing regeneration. Softened water is then passed, by way of flowmeter 9, to a further three-way solenoid valve 10. The flowmeter 9 is used to monitor the amount of softened water produced by the water softeners 4, 5 and thereby to determine when the active duty cycle for each water softener 4, 5 is complete and when regeneration is to commence. At the three-way solenoid valve 10, softened water is routed either to saturated salt solution make-up tank 11 by way of flow meter 12, or to saturated salt solution storage tank 13, or to softened-water storage tank 14.

Figure 1:
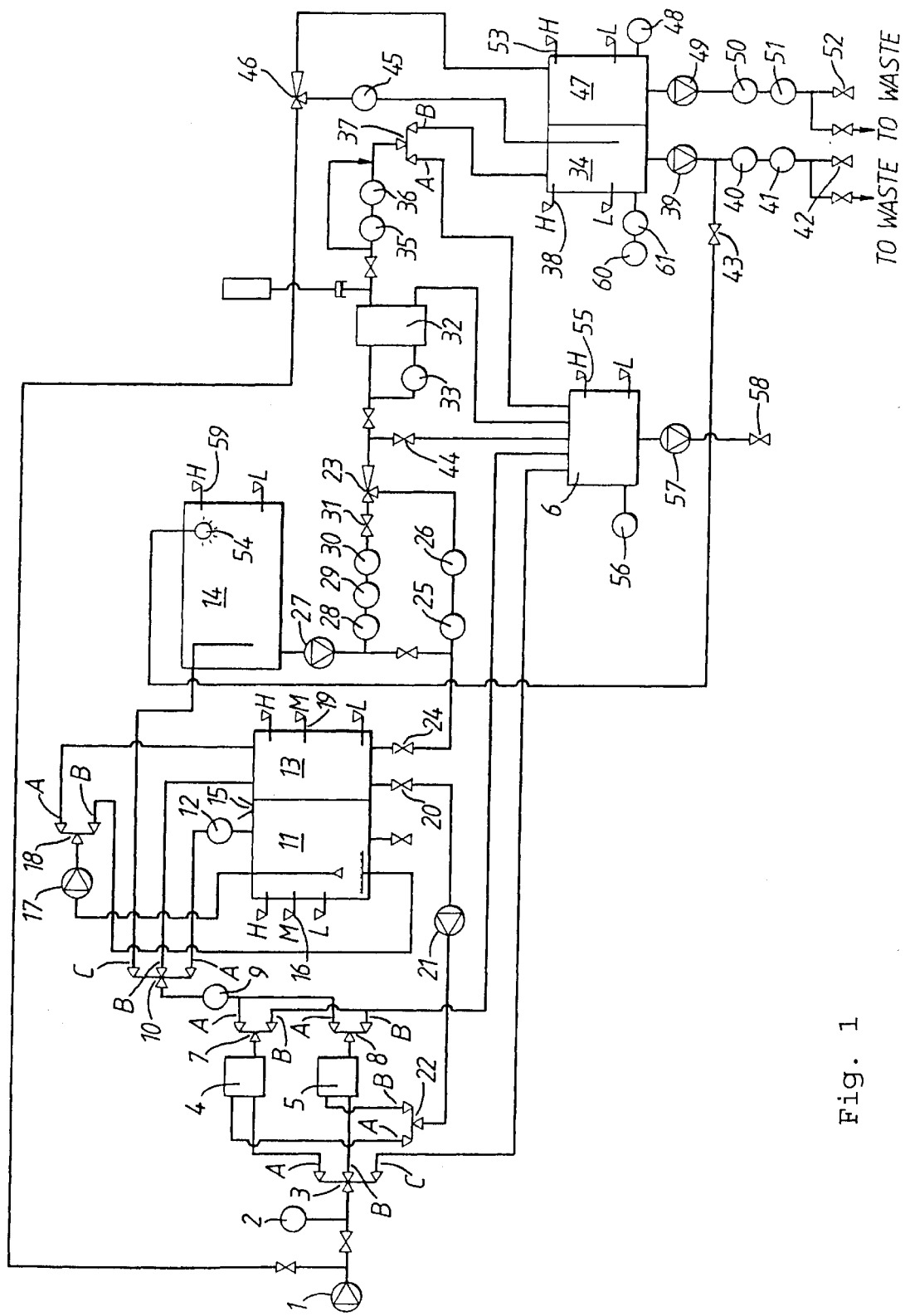

Upon initial start-up of the system, both the saturated salt solution make-up tank 11 and the saturated salt solution storage tank 13 will be empty. A given volume (e.g. 30 liters) of water is added to the make-up tank 11 followed by a predetermined amount (e.g. 70 kg) of salt by way of salt chute 15. Salt addition is stopped if three-position float level switch 16 indicates that the make-up tank 11 is full. Softened water is then added by way of three-way valve 10 until the make-up tank 11 is full, if it is not so already, and the solution recirculated by way of pump 17 and two-way solenoid valve 18 for a predetermined time (e.g. 10 minutes) until saturation is achieved. A volume of saturated salt solution equal to the given volume of water (e.g. 30 liters) is then transferred by way of pump 17 and two-way solenoid valve 18 to the storage tank 13 and a further given volume (e.g. 30 liters) of water added to the make-up tank 11. This cycle is repeated in order to make up fresh saturated salt solution as the solution in the storage tank 13 is used in the water softeners 4, 5 and in the production process. Eventually, as the salt in the make-up tank 11 is used up, the addition of the given volume of water (e.g. 30 liters) will fail to cause the fill level in the make-up tank 11 to reach a predetermined low level as a result of the crystalline salt displacing less water. At this point, the low position of three-way float switch 16 is triggered and salt is added to the make-up tank 11 until the float level switch 16 indicates that the tank 11 is full again. The middle position of three-way float switch 16 is used to calibrate the flow meter 12.

The storage tank 13 is also provided with a three-level float switch 19. The high position is set to prevent overfilling, the middle position is set to call for more saturated salt solution from the make-up tank 11, and the low position raises an alarm and halts the production process.

The saturated salt solution held in the storage tank 13 is used both to regenerate the water softeners 4, 5 as well as to produce sterilising fluid. For water softener regeneration, a supply of saturated salt solution is taken from the storage tank 13 by way of solenoid valve 20 and pump 21 to the water softeners 4, 5. A two-way solenoid valve 22 is used to route the saturated salt solution only to the water softener 4, 5 which is undergoing regeneration. A second supply of saturated salt solution is taken from the storage tank 13 and routed to venturi 23 by way of solenoid valve 24, flow regulator 25 and filter 26. A supply of softened water is taken from the softened-water storage tank 14 to the venturi 23 by way of pump 27, flow regulator 28, flow meter 29, filter 30 and solenoid valve 31. At the venturi 23, the second supply of saturated salt solution is introduced at a regulated rate into the supply of softened water emanating from the softened-water storage tank 14. The rate at which the saturated salt solution is introduced into the softened water supply so as to achieve a mixture of saturated salt solution and water is regulated by the process requirements, in particular the requirement to produce a sterilising solution with well-defined chemical characteristics. It should be noted that the softened-water storage tank 14 is provided with a two-level float switch 59 which serves to prevent overfilling and which raises an alarm and halts the process should the storage tank 14 become empty.

The mixture of saturated salt solution and water is then passed into an electrochemical activator 32, which is made up of a number of electrolytic cells (not shown). The electrolytic cells each have a working chamber and an auxiliary chamber, the chambers being separated by a porous membrane. In general, the working chamber includes the anode and the auxiliary chamber the cathode, although this configuration may be reversed if required. The saturated salt solution and water mixture is passed directly into the working chambers of the cells making up the electrochemical activator 32, and by way of flow regulator 33 into the auxiliary chambers. The output of the auxiliary chambers is passed to waste 6, whereas the output from the working chambers comprises a sterilising solution which has a lower pH value and higher redox potential than the input solution, and has dissolved in it various bactericidal and sporicidal components such as, for example, chlorine, chlorine dioxide, ozone and hydrogen peroxide.

The sterilising solution is passed to sterilising solution storage tank 34 by way of redox potential probe 35, pH probe 36 and two-way solenoid valve 37. The probes 35 and 36 monitor the redox potential and the pH of the sterilising solution. Should these fall outside predetermined limits, e.g. pH 5.0 to 7.0 and redox potential 900 to 1200 mV, then the sterilising solution is deemed to be out of specification and the two-way valve 37 is operated so as to route the solution to waste 6. These probes 35, 36 may also be used as part of a feedback loop to control the venturi 23 and/or the flow regulator 25 and/or the flow regulator 33 so as to adjust the ratio of saturated salt solution to softened water in the supply to the electrochemical activator 32 and to regulate the flow rate of the supply itself. If the pH and redox potential readings are satisfactory, the two-way valve 37 is set to pass the sterilising solution to the sterilising solution storage tank 34. The sterilising solution storage tank 34 is provided with a two-level float switch 38 which serves to halt production of sterilising solution when the tank 34 becomes full, and which raises an alarm and prevents further dispensing of sterilising solution should the tank 34 become empty. In addition, the sterilising solution storage tank 34 is provided with a pH probe 60 and a redox potential probe 61 which continuously monitor the pH and the redox potential of the stored sterilising solution. Should these fall outside predetermined limits, e.g. pH 5 to 7 and redox potential 800 to 1000 mV, the sterilising solution is deemed to be out of specification and is passed to waste instead of being dispensed.

Sterilising solution is dispensed from the storage tank 34 by way of pump 39, pressure switch 40, flow meter 41 and solenoid valve 42. One particular use of the described embodiment of the present invention is to provide sterilising fluid for use in endoscope washing machines. An endoscope washing machine (not shown), which is in itself known, can be connected to an embodiment of the present invention by way of a dispensing pipeline only, with no electrical connections being required. The dispensing pump 39 will operate depending on the pressure within the pipeline, which is monitored by the pressure switch 40. When the endoscope washing machine requires sterilising fluid, a solenoid valve in the washing machine will open, causing a pressure drop in the pipeline. This is sensed by the pressure switch 40, which will then actuate the pump 39 in order to dispense sterilising fluid. When the washing machine solenoid valve closes again, the pressure in the dispensing pipeline will rise until it reaches a predetermined value, at which point the pressure switch 40 will be actuated to stop the pump 39.

Sterilising fluid stored in the sterilising fluid storage tank 34 can also be used to flush out parts of the system, in particular the softened-water storage tank 14 and the filters 26 and 30 in order to inhibit or eliminate bacterial growth. This may be done by opening solenoid valve 43 and passing sterilising fluid to the softened-water storage tank 14 by way of spray bar 54 and from there through the filters and thence to waste 6 by way of solenoid valve 44.

Sterilising fluid can also be used to generate a supply of sterile water. To do this, a supply of sterilising solution is taken from the sterilising fluid storage tank 34, by way of flow regulator 45, to a venturi 46, where it is introduced at a predetermined rate into a flow of water. Typically, a 1% solution of sterilising solution is specified, and this is stored in sterile water storage tank 47. The storage tank 47 is provided with a redox potential probe 48 which monitors the redox potential of the sterile water. Should this fall outside a predetermined range (e.g. 800 to 900 mV), the sterile water is deemed to be out of specification and is passed to waste 6. Otherwise, the sterile water may be dispensed, e.g. for use in an endoscope washing machine, in a manner similar to that used to dispense sterilising solution, by way of pump 49, pressure switch 50, flow meter 51 and solenoid valve 52. The sterile water storage tank 47 is further provided with a two-level float switch 53 which serves to halt production of sterile water when the tank 47 becomes full, and which raises an alarm and prevents further dispensing of sterile water should the tank 47 become empty.

The production of sterilising solution and of sterile water may be such as to meet a demand of 250 liters per hour.

The waste tank 6 is provided with a two-level float switch 55 which serves to prevent overfilling. There is also provided a pH probe 56 which monitors the pH of the waste stored in the tank 6. The tank 6 may be emptied by way of pump 57 and solenoid valve 58.

We claim:

1. An apparatus for generating a sterilising solution, said apparatus comprising:
    a mains water input line;
    a waste;
    at least one ion exchange water softener connected to said mains water input line and having a softened water output line;
    a temperature probe in said mains water input line for checking that the mains water supplied to said at least one ion exchange water softener has a temperature in the range of 10° C. to 25° C.;
    at least one first solenoid valve in said mains water input line and responsive to said temperature of the mains water sensed by said temperature probe to pass mains water to said at least one ion exchange water softener when the temperature of the mains water is inside said range of 10° C. to 25° C. or to pass mains water to said waste when the mains water is outside said range of 10° C. to 25° C.;
    a second solenoid valve in said softened water ouput line;
    a first flowmeter in said softened water output line downstream of said second solenoid valve;
    said second solenoid valve being operative either to pass softened water to said first flowmeter or regeneration liquid to said waste depending on whether said at least one ion exchange water softener is on active duty or undergoing re-generation;
    said first flowmeter acting to monitor the amount of softened water produced by said at least one ion exchange water softener and thereby to determine when active duty for said at least one ion exchange water softener is complete and when regeneration is to commence;
    a third solenoid valve in said softened water output line downstream of said first flowmeter;
    a saturated salt solution tank having an input line connected to said third solenoid valve;
    a saturated salt solution make-up tank having an input line connected to said third solenoid valve via a second flowmeter;
    a softened water storage tank having an input line connected to said third solenoid valve, and a softened water storage tank output line;
    said third solenoid valve being operative to route softened water to any one of said saturated salt solution tank, said saturated salt solution make-up tank and said softened water storage tank;
    a salt chute for feeding salt into said saturated salt solution make-up tank;
    a re-circulation loop comprising a pump and a fourth solenoid valve which, in one position allows salt solution being made up in said make-up tank to re-circulated until saturation is achieved, at which time saturated salt solution is passed via a second position of the said fourth solenoid valve to said saturated salt solution storage tank;
    said saturated salt solution storage tank having a first saturated salt solution storage tank output line leading to said at least one ion exchange water softener via a fifth solenoid valve for re-generating said at least one ion exchange water softener, and a second saturated salt solution storage tank output line joined to said softened water storage tank output line to provide a mixed supply line;
    at least one electrolytic cell having a working chamber and an auxiliary chamber separated by a porous membrane, one of said chambers including an anode and the other of said chambers including a cathode, and said working and auxiliary chambers having respective input lines connected to said mixed supply line;
    a sixth solenoid valve;

said working chamber having an output line for outputting a sterilising solution via said sixth solenoid valve;

said auxiliary chamber having an output line connected to said waste via said sixth solenoid valve;

pH sensors and redox potential sensors for monitoring the pH and redox potential of the sterilising solution in the output line from said working chamber and for monitoring and indicating an alarm condition if sterilising solution in the said output line from the said working chamber has a pH outside a range 4.0 to 7.0 and a redox potential outside a range 800 to 1300 mV; and said sixth solenoid valve being set to output sterilising solution when either or both of the redox potential and pH of said sterilising solution are inside said ranges, and to pass said sterilising solution from said working chamber output line to said waste when either or both of the redox potential and pH are outside said ranges.

* * * * *